(12) United States Patent
Pantazelos

(10) Patent No.: US 10,931,676 B2
(45) Date of Patent: Feb. 23, 2021

(54) CONDITIONAL DELIVERY OF CONTENT OVER A COMMUNICATION NETWORK INCLUDING SOCIAL SHARING AND VIDEO CONFERENCE APPLICATIONS USING FACIAL RECOGNITION

(71) Applicant: FYFO LLC, Medfield, MA (US)

(72) Inventor: George Pantazelos, Medfield, MA (US)

(73) Assignee: FYFO LLC, Park City, UT (US)

( * ) Notice: Subject to any disclaimer, the term of this patent is extended or adjusted under 35 U.S.C. 154(b) by 270 days.

(21) Appl. No.: 15/708,853

(22) Filed: Sep. 19, 2017

(65) Prior Publication Data

US 2018/0083978 A1    Mar. 22, 2018

Related U.S. Application Data

(60) Provisional application No. 62/397,579, filed on Sep. 21, 2016, provisional application No. 62/523,453, (Continued)

(51) Int. Cl.
*H04L 29/06* (2006.01)
*H04W 12/06* (2021.01)
(Continued)

(52) U.S. Cl.
CPC ............ *H04L 63/102* (2013.01); *G06F 21/10* (2013.01); *G06F 21/32* (2013.01);
(Continued)

(58) Field of Classification Search
CPC ...... G06F 21/32; G06F 21/31; G06F 21/6209; H04L 63/0861
See application file for complete search history.

(56) References Cited

U.S. PATENT DOCUMENTS 6,055,315 A    4/2000 Doyle et al.
7,143,290 B1 * 11/2006 Ginter .................... G06Q 20/02
                                                    713/176
(Continued)

OTHER PUBLICATIONS

B. Gallagher, "A Tale of Two Patents: Why Facebook Can't Clone Snapchat", https://techcrunch.com/2014/06/22/facebook-slingshot-snapchat-patents/, Jun. 22, 2014, pp. 1-10, AOL Inc.
(Continued)

*Primary Examiner* — James R Turchen
(74) *Attorney, Agent, or Firm* — Intrinsic Law Corp.

(57) ABSTRACT

A system and method are provided for conditional delivery of electronic content such as images or video stream content over a communication network. In some embodiments, a condition for receiving such content is determined, for example a verification of a biometric fact as a face recognition or a finger print. The content will then be delivered conditioned on the satisfaction of the condition. In some embodiments, facial detection technology is used continually while sent content is being displayed to ensure that content is being viewed solely by the intended recipient. In some embodiments, the recipient's reaction to sent content is recorded on video and sent to the sender as a condition of viewing the sent content. In some embodiments, two or more users interact with one another in real time in a secure video conference.

29 Claims, 17 Drawing Sheets

Related U.S. Application Data filed on Jun. 22, 2017, provisional application No. 62/535,346, filed on Jul. 21, 2017.

(51) Int. Cl.
| | | |
|---|---|---|
| *H04N 7/15* | (2006.01) | |
| *G06F 21/62* | (2013.01) | |
| *G06K 9/00* | (2006.01) | |
| *H04W 12/08* | (2021.01) | |
| *G06F 21/10* | (2013.01) | |
| *G06F 21/32* | (2013.01) | |

(52) U.S. Cl.
CPC ...... *G06F 21/6245* (2013.01); *G06F 21/6263* (2013.01); *G06K 9/00288* (2013.01); *H04L 63/0861* (2013.01); *H04L 63/10* (2013.01); *H04L 63/108* (2013.01); *H04N 7/152* (2013.01); *H04N 7/155* (2013.01); *H04W 12/06* (2013.01); *H04W 12/08* (2013.01)

(56) References Cited

U.S. PATENT DOCUMENTS

| | | | |
|---|---|---|---|
| 7,356,510 B2 | 4/2008 | Durand et al. | |
| 7,356,848 B1 | 4/2008 | Duffield et al. | |
| 7,991,388 B1* | 8/2011 | Becker | G06Q 20/3276 455/411 |
| 8,131,865 B2 | 3/2012 | Rebaud et al. | |
| 8,307,029 B2 | 11/2012 | Davis et al. | |
| 8,428,453 B1 | 4/2013 | Spiegel et al. | |
| 8,489,887 B1* | 7/2013 | Newman | H04L 65/403 713/182 |
| 8,799,371 B2 | 8/2014 | Davis et al. | |
| 8,949,347 B2* | 2/2015 | Errico | G06Q 10/107 709/206 |
| 8,966,643 B2 | 2/2015 | Chen et al. | |
| 9,118,809 B2* | 8/2015 | Anderson | H04L 65/1069 |
| 9,131,339 B1* | 9/2015 | Kulfan | A63F 13/216 |
| 9,143,681 B1 | 9/2015 | Ebsen et al. | |
| 9,282,284 B2* | 3/2016 | Kajarekar | H04N 7/15 |
| 9,626,493 B2* | 4/2017 | Cohen | G06F 21/16 |
| 9,633,186 B2* | 4/2017 | Ingrassia, Jr. | G06F 21/32 |
| 9,891,803 B2* | 2/2018 | Scott | H04N 7/15 |
| 10,298,547 B2* | 5/2019 | Ziebell | H04L 51/32 |
| 2006/0041755 A1* | 2/2006 | Pemmaraju | H04L 63/083 713/182 |
| 2006/0259755 A1* | 11/2006 | Kenoyer | G06F 21/32 713/1 |
| 2009/0150489 A1 | 6/2009 | Davis et al. | |
| 2009/0317060 A1* | 12/2009 | Han | H04N 9/8205 386/248 |
| 2011/0067098 A1* | 3/2011 | Nelson | G06F 21/32 726/21 |
| 2011/0093942 A1 | 4/2011 | Koster et al. | |
| 2012/0216293 A1 | 8/2012 | Rebaud et al. | |
| 2013/0036458 A1 | 2/2013 | Liberman et al. | |
| 2013/0109349 A1 | 5/2013 | Iyengar | |
| 2013/0179911 A1* | 7/2013 | Dang | G06F 3/0304 725/12 |
| 2013/0219459 A1* | 8/2013 | Bradley | H04L 63/104 726/1 |
| 2013/0305158 A1* | 11/2013 | Vasquez | H04N 21/44218 715/733 |
| 2014/0047413 A1* | 2/2014 | Sheive | G06F 8/30 717/110 |
| 2014/0049653 A1* | 2/2014 | Leonard | H04N 5/44 348/207.1 |
| 2014/0115179 A1 | 4/2014 | Rebaud et al. | |
| 2014/0123260 A1* | 5/2014 | Choi | H04L 63/0861 726/7 |
| 2014/0129953 A1 | 5/2014 | Spiegel | |
| 2014/0149888 A1 | 5/2014 | Morris | |
| 2014/0150072 A1* | 5/2014 | Castro | H04L 63/104 726/5 |
| 2014/0229544 A1 | 8/2014 | Evans et al. | |
| 2014/0341444 A1* | 11/2014 | Hou | G06F 21/32 382/118 |
| 2015/0095352 A1* | 4/2015 | Lacey | G06Q 20/40145 707/752 |
| 2015/0097922 A1* | 4/2015 | Le Devehat | H04L 65/403 348/14.08 |
| 2015/0381575 A1* | 12/2015 | Bhargav-Spantzel | H04L 63/0861 713/168 |
| 2016/0007171 A1 | 1/2016 | Geller et al. | |
| 2016/0063235 A1* | 3/2016 | Tussy | G06Q 20/3276 726/6 |
| 2016/0112428 A1 | 4/2016 | Terleski et al. | |
| 2016/0188958 A1* | 6/2016 | Martin | G06K 9/00906 382/118 |
| 2016/0234551 A1* | 8/2016 | Allegretti | H04N 21/23418 |
| 2016/0366203 A1* | 12/2016 | Blong | H04L 51/32 |
| 2017/0063852 A1* | 3/2017 | Azar | G07C 9/37 |
| 2017/0208362 A1* | 7/2017 | Flores | H04L 65/60 |
| 2017/0220578 A1* | 8/2017 | Kazi | G06F 40/30 |
| 2017/0228600 A1* | 8/2017 | Syed | G06K 9/325 |
| 2017/0251366 A1* | 8/2017 | Perna | H04L 63/0861 |
| 2017/0374074 A1* | 12/2017 | Stuntebeck | H04L 63/102 |
| 2018/0332318 A1* | 11/2018 | Nagy | H04N 21/47205 |

OTHER PUBLICATIONS

J. Constine, "Facebook's Slingshot Challenges Snapchat With 'Reply to Unlock'", https://techcrunch.com/2014/06/17/facebook-slingshot/, Jun. 17, 2014, pp. 1-2, AOL Inc.

G. Sloane, "This Small Startup Says Facebook Imitated Its Photo App Idea", http://www.adweek.com/news/technology/small-startup-says-facebook-imitated-its-photo-app-idea-158425, Jun. 18, 2014, p. 1-1, Adweek.

\* cited by examiner

CONDITIONAL DELIVERY OF CONTENT OVER A COMMUNICATION NETWORK INCLUDING SOCIAL SHARING AND VIDEO CONFERENCE APPLICATIONS USING FACIAL RECOGNITION

RELATED APPLICATIONS

This application claims the benefit of and priority to U.S. Provisional Application No. 62/397,579, filed on Sep. 21, 2016, entitled "Conditional Delivery of Digital Content Over a Communication Network"; U.S. Provisional Application No. 62/523,453, filed on Jun. 22, 2017, entitled "Conditional Delivery of Content Over a Communication Network Including Social Sharing Application Using Facial Recognition"; and U.S. Provisional Application No. 62/535,346, filed on Jul. 21, 2017, entitled "Conditional Delivery of Digital Content Over a Communication Network Including Social Sharing and Video Conference Applications Using Facial Recognition." All of the foregoing applications are incorporated herein by reference.

TECHNICAL FIELD

The present application relates generally to delivery or exchange of digital content and media such as image or video data files or live video feeds between users over a communication network based on one or more conditions for delivery of said content or media.

BACKGROUND

Computer programs have been developed for exchanging electronic files over a communication network. Upon the introduction of mobile computing platforms and so-called smart phones and similar portable communication devices, such programs and applications (sometimes referred to as Apps or apps) were extended to run on these mobile devices. Today, millions of wireless and mobile communication devices have installed apps for sending and receiving image files such as digital photographs, video segments or similar content. Messaging and social media apps such as Facetime, Snapchat, ooVoo and many others allow a user to take an image or video clip, e.g., a digital photograph, and send the image to a friend or group of contacts reachable over a communication network (e.g., cellular network, WiFi).

Most such photo sharing applications allow the sender or owner of an image to control the delivery of the image insofar as the one or more recipients of the image. For example, a user can take a digital photograph using a camera-equipped smartphone, then select from his or her contacts list one or more friends or contacts to which the image is to be delivered, or who will receive a notification and access to view the image. The notifications are usually delivered to the recipients as short messages or notification alerts that pop up on the recipients' devices, or by way of a message, email or similar notification sent to an address or telephone number associated with the intended contacts.

Delivery of images, videos and similar content over mobile communication device networks generally assumes that an owner or user of a device is the only authorized user of the device. Therefore, a message sent to a recipient from a sender's contacts list is in fact sent to the device associated with that recipient, e.g., the recipient's telephone number, email address, network address, etc. So, if an intended recipient leaves his or her device accessible to others, anyone with access to the device could inadvertently view the content sent to the device. Similarly, if more than one person owns a device (e.g., a husband and wife, siblings, coworkers) it is not possible to control which human user will be the one to open and review the delivered content. This issue applies to content delivery in general, absent a personal login or authentication code, not just images, but we can use the example of image delivery to illustrate the present concepts.

As can be appreciated, an issue can arise if the sender of the image considers the content of the image to be of sensitive or very personal nature and needs to know that the actual human recipient to whom the image is sent is in fact the person viewing the delivered image or confidential content. Also, there is a need to improve real time response delivery so that a sender knows what response, if any, the recipient had to sent content. Current systems allow a response from a recipient to be delivered to the sender acknowledging received content, but the response is generated after the fact and not in real time, so that the recipient's response lacks the spontaneity that may be desired or amusing to the sender of the content. In addition, current systems lack sufficient identity verification with respect to verifying the identity of a participant in a remote electronic meeting session.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

As mentioned above, the present invention relates to new and improved systems and methods for securely delivering and exchanging digital content and media between users over a communications network. In particular, the present application relates to methods for delivering content to a specified user while ensuring that only the intended recipient is able to view the content, and for capturing video images of the face of the recipient while he/she is viewing the content.

An aspect of the disclosure relates to a method for securely delivering content, such as a video recording, over communications network, from one user's computing device to another user's computing device, using facial recognition and facial detection technology along with the receiving device's front-facing camera to ensure that the content is seen only by the intended recipient. In an aspect, the receiving device captures video images of the recipients face while watching and reacting to the content, and sends such images to the sender.

An aspect of the disclosure relates to a method for two or more persons to engage in a secure video conference call over a communications network, using their respective computing devices equipped with front-facing cameras, and using facial recognition and facial detection technology along with such cameras to ensure that only the intended participants are participating in the video conference call.

An aspect of the disclosure relates to a system that permits participants to securely share content with one another over a communications network, using their respective computing devices equipped with front-facing cameras. The system uses facial recognition and facial detection technology along with the receiving device's front-facing camera to ensure that the content is seen only by the intended recipient. In an aspect, users of the system can verify other users' identities, allowing for improved identify verification within the overall system.

IN THE DRAWINGS

For a fuller understanding of the nature and advantages of the present technology, reference is made to the following detailed description of preferred embodiments and in connection with the accompanying drawings, in which.

Figure 12A:
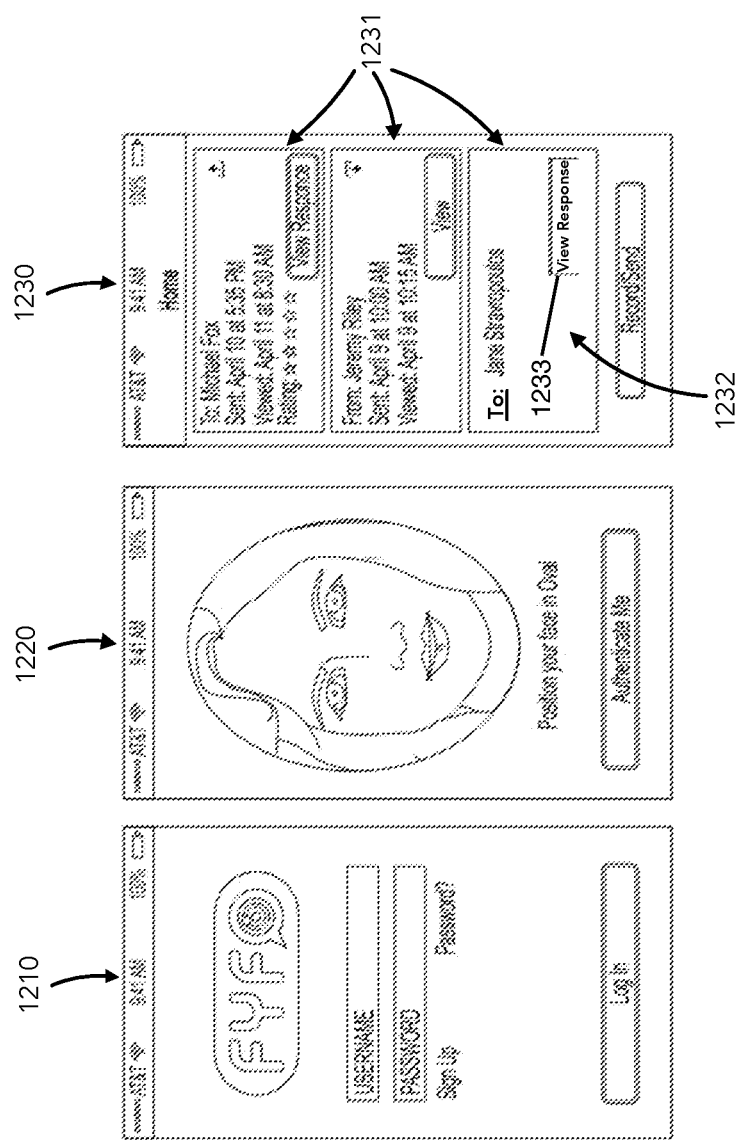
Figure 12B:
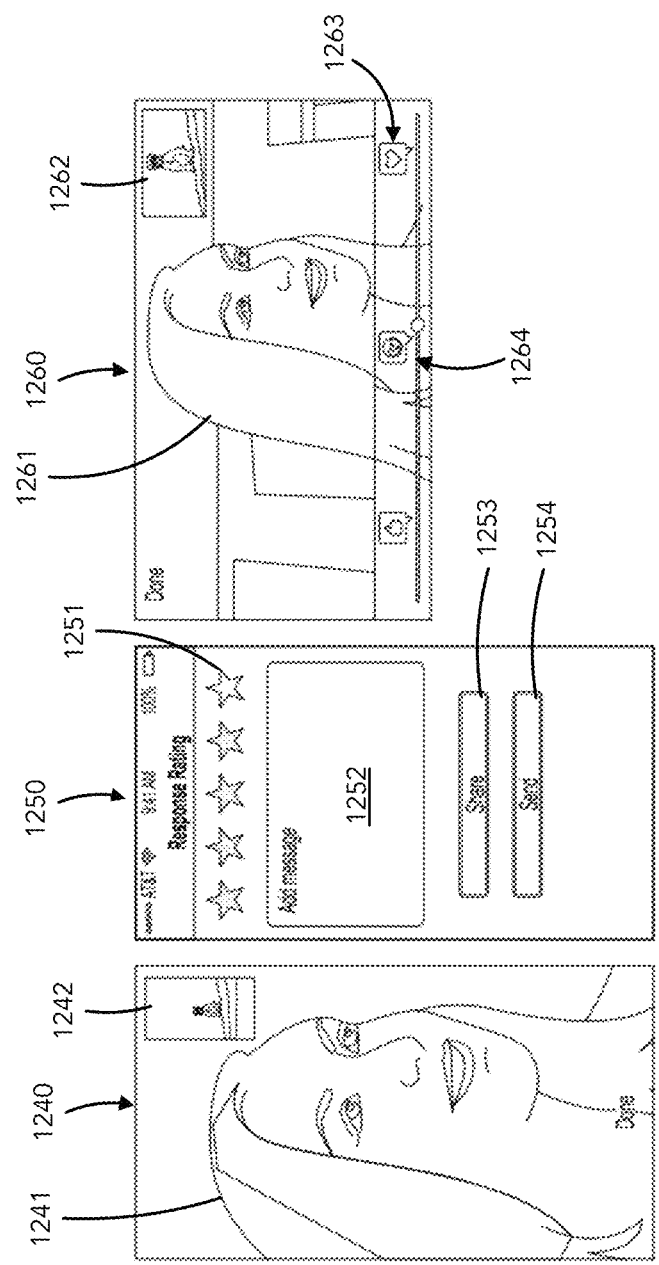
Figure 13:
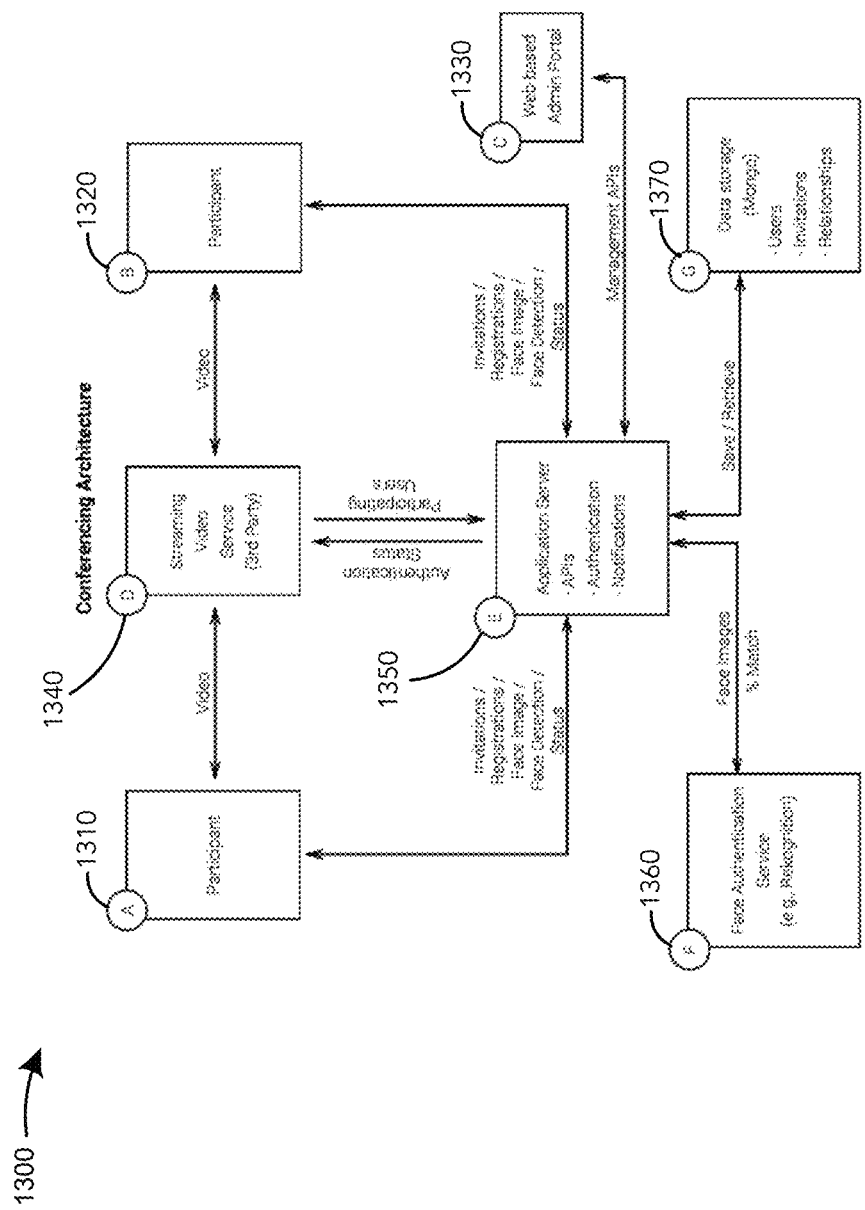

FIGS. 12A and 12B shows exemplary screenshots that would be seen by one who is using the system and method disclosed herein to send video content and to receive the recipient's reaction to such content, according to some embodiments; and FIG. 13 is a schematic diagram illustrating a representative architecture for the use of the system and method disclosed herein for video conferencing, according to some embodiments.

DETAILED DESCRIPTION

The present system and method addresses several deficiencies or lack of desired outcomes in the art. In an aspect, the technology addresses privacy concerns whereby a communication device accessible to multiple users accidentally presents content to one of the users who is not the intended recipient user. In another aspect, a sender of content (e.g., an image) may desire to see the reaction or response of the recipient of the content upon its delivery, especially in real time. In yet another aspect, the present system and method offer facial, retina, fingerprint, or other biometric-based confirmation of the identity of a recipient of shared information for added authentication, privacy, and personalization in the context of media communication, social networking applications and similar uses.

Figure 1:
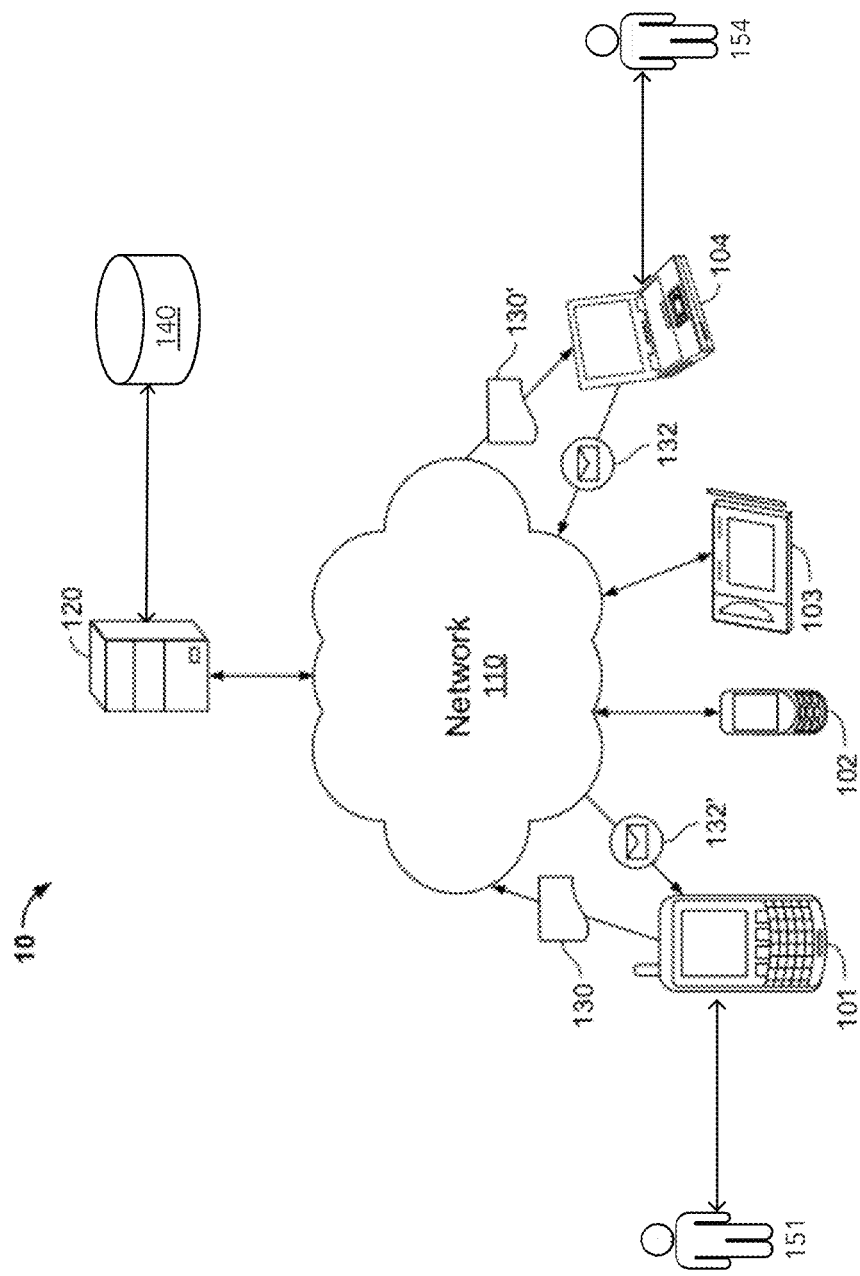
FIG. 1 is a schematic depiction of a representative environment of the system and method disclosed herein according to an embodiment.

FIG. 1 illustrates a representative environment 10 supporting the present system and method. The environment 10 includes client devices 101-104 in communication with a server 120 over a network 110. The client devices 101-104 can include desktops, laptops, smartphones, tablets, netbooks, and the like. Each client device 101-104 includes a processor, memory, a display, a physical or virtual keyboard, a mouse, touchscreen or similar pointing device, and a modem to connect to the network 110. The client devices 101-104 can also include or can be connected to a camera and/or a video camera. In general, each client device 101-104 runs an operating system that handles major housekeeping and coordination of processes on the computer. Each client device 101-104 is further adapted and arranged to run an application that allows the users of the client devices 101-104 to communicate and share content in transmitted and received data files, e.g. messages 130 and 132, while ensuring that one or more rules are followed.

The network 110 can be a public or private wide-area network, local-area network, mesh network, or other type of communication network. In one or more embodiments, the network 110 is or includes the Internet.

The server 120 is in communication with client devices 101-104 through the network 110. The server 120 includes or is in communication with a database 140 that includes user profile data.

In an example, a sender 151 uses his or her smartphone 101 to capture an image or a video, e.g., a photograph or movie. The sender 151 selects one or more recipients from a set of contacts using a user interface of a contacts or social messaging app on the user's smartphone 101. The photograph or video is encoded or packaged into a digital message 130 and is sent over the communication network 110 to a server 120, which assists in delivering a copy or version 130' of the digital message 130 to its recipient 154 using his or her device 104. Recipient 154 is not permitted to open and view the contents 130' until he or she agrees to certain conditions such as to responding in real time or such as to allow a return photograph to be sent back to sender 151. We may refer to such a return or reply signal or message as a response message 132. Recipient 154 allows the capturing and sending of a response 132, which then permits recipient 154 to see the content of message 130' (e.g., the photograph sent by sender 151). Sender 151 receives the confirmation and response message 132'. In this example, the image content 130 and 130' may be identical or may correspond to one another, e.g., through a suitable formatting, compression, encryption or other processing function. Likewise, the response message 132 and 132' may be identical or may be processed by server 120 or another element in route from device 104 to device 101.

Figure 2:
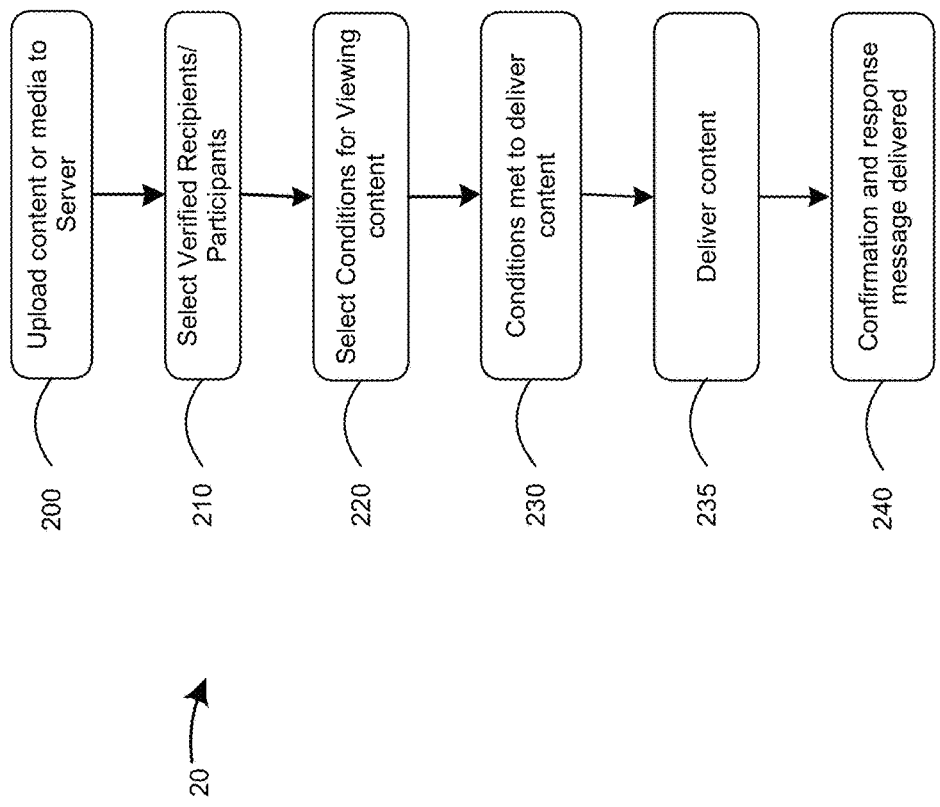
FIG. 2 is a flow chart illustrating aspects of the technology disclosed herein according to some embodiments.

FIG. 2 is a flow chart 20 that illustrates one or more aspects of the present technology. In step 200, an originator uses the application on his device (e.g., smartphone 101) to upload to the server 120 one or more photos or videos that the user intends to share. The photos and videos can be stored locally on the computer 101. Alternatively, they can be stored in external memory (e.g., flash drive, external hard drive, memory of camera, etc.) or network-accessible memory (e.g., Dropbox, Google Drive, etc.). In some embodiments, the originator can initiate a meeting to stream or multi-stream live video to other verified user participants.

In step 210, the originator selects the verified recipients of the media or the participants of the meeting. The verified recipients/participants can be selected from a list of users whose identities have already been verified. The users' identities can be verified by the originator, by other verified participants, and/or by the server. User identification is discussed in more detail below.

In step 220, the originator selects the conditions required for the invited participants to view the media. The conditions may include identity verification using facial recognition, fingerprint scanning, or retinal scanning. The conditions may also include sharing with the originator or all participants the facial reactions of the participants to viewing the media using the selfie camera or another verification device of the recipient's smartphone or computer. The conditions may also include blocking of screenshots by the originator or participants during playback or streaming.

In some embodiments, the originator and the invited participants can negotiate the conditions for viewing, depicted at step 220. For example, the originator may propose a first set of conditions (say facial recognition, retinal scanning, and screenshot blocking) and one or more invited participants may only partially agree to the first set of conditions (say facial recognition and screenshot blocking but not retinal scanning). The invited participant(s) can then send the partially-agreed to list of conditions back to the originator as a counteroffer or they can propose a replacement condition for the condition not agreed upon (e.g., reject facial authentication but propose fingerprint scanning instead).

Once the conditions for viewing content have been met at step 230 the content (e.g., a photo) can be revealed to the recipient at step 235. As discussed above a response message may be generated at the recipient's device (e.g. device 104), which at step 240 is sent back to the original sender of the content along with a confirmation that the content was delivered. In an embodiment, a continuous (or repeated) checking of a condition is performed for the content to continue to be presented to the recipient. If such conditions (e.g., facial recognition of the recipient) cease to be true, then the delivery of the content (e.g., a video stream) can be stopped.

The condition may be the back-transmission (from the recipient to the sender) of a "selfie" photo from the recipient's device, or a streaming video of the recipient captured by the recipient's device (e.g., the selfie camera on the recipient's smartphone).

The server and the smart phones of the participants may have previously stored facial recognition, fingerprint, or retinal identities for the participants. The participants' identities will have been verified by the originator and or other participants.

Those skilled in the art will appreciate that facial recognition or processing of biometric information, images and streaming videos can be performed on a communication or processing server, e.g., connected to the recipient and/or sender's devices over a communication network. Alternatively, if a server is not available, or if the server is busy, or if by design choice the system is so set up, the devices themselves can locally perform such image recognition and other processing steps instead of the server.

The technology disclosed herein may be embodied in a social sharing-type software application that allows a user to securely share content, such as videos and images, with another user (friend, colleague, etc.) using biometric authentication, such as facial recognition and face detection, to confirm the identity of both users. Facial recognition allows users to confidently share sensitive, private content by ensuring that the content is seen only by the intended recipients. The application is designed to run as a native application on mobile devices such as smartphones, tablets, etc., including devices using the iOS and Android mobile operating systems, or to run as a web-based or native application on devices, including desktop and laptop computers, that are camera-equipped or camera-enabled, although other platforms and devices are contemplated by the disclosure herein. The application uses a device's front-facing camera (which could be an external camera in some embodiments) so that when a recipient views a video or image, the camera records the recipient's reaction and delivers a reaction video back to the sender, where the sender can see the reaction video simultaneously with, and synchronized with, the original, sent content (e.g. as a picture-in-picture) so that the sender can see exactly what the recipient is reacting to.

The application uses facial recognition biometrics to confirm that all users' identities are confirmed upon receiving content in the application. Facial recognition is driven by a cloud-based third-party service such as Amazon Rekognition in some embodiments. In some embodiments, the application uses other types of biometric identification to confirm users' identities, such as fingerprint identification (e.g. Touch ID), as a supplement to or in lieu of facial recognition, and such other means of authentication are within the scope of this disclosure.

Facial detection, which does not verify identity but detects the presence (or absence) of a face in a camera's field of view, is performed by a user's mobile device using facial detection features of the device's operating system. When a user is viewing content shared using the application, facial detection runs continuously to ensure that the intended recipient is the only person viewing the content. If the recipient's face is not properly framed in the front-facing camera viewport or an additional or unauthorized viewer is detected, the original content will immediately go into stop/blur status until the recipient re-authenticates. The application thus allows, in effect, continual biometric-based authentication in real time while viewing content.

Users' identities can be validated by other users in the application. Presenting and tracking the number of "validations" each user receives based on face image and cell phone number can be performed. The more friends validate the face and cell number, the more confidence senders will have in the receiver's identity.

To assure security and privacy of communications using the application, all data sent over the internet are permission-based, encrypted and sent via HTTPS or similar protocol.

A sender can select content for the application by shooting an original photo or video from within the application using the device's front- and/or rear-facing cameras; or alternatively the user can select a pre-existing image or video from the device's library or other content repository, including memory cards, disk drives, cloud-based storage and other such digital storage, or insert a hyperlink to content published on the internet. When a recipient views content using the application, the application automatically generates a reaction video using the recipient device's front-facing camera.

Sharing content within the application follows the primary user flows and is dependent on facial recognition and detection. The application in some embodiments has sharing capabilities to allow users to post, to social media platforms outside the application, videos and reactions that are shared using the application; but users must agree to allow such sharing before content can be shared. Users can opt into or out of social sharing capabilities. For example, a sender can specify whether or not a sent image or video can be shared outside the application, and a recipient can do likewise with respect to the reaction video created by the application. Also, a sender has the option to specify that a recipient must opt in to sharing the recipient's reaction in order to view the original content, and if the recipient does not agree to the sender's specification, the original content will not play for the recipient.

In some embodiments, the application allows users to rate content shared via the application, using a star rating system or other means. In some embodiments, recipients can use emoji to enhance reaction videos.

Figure 3:
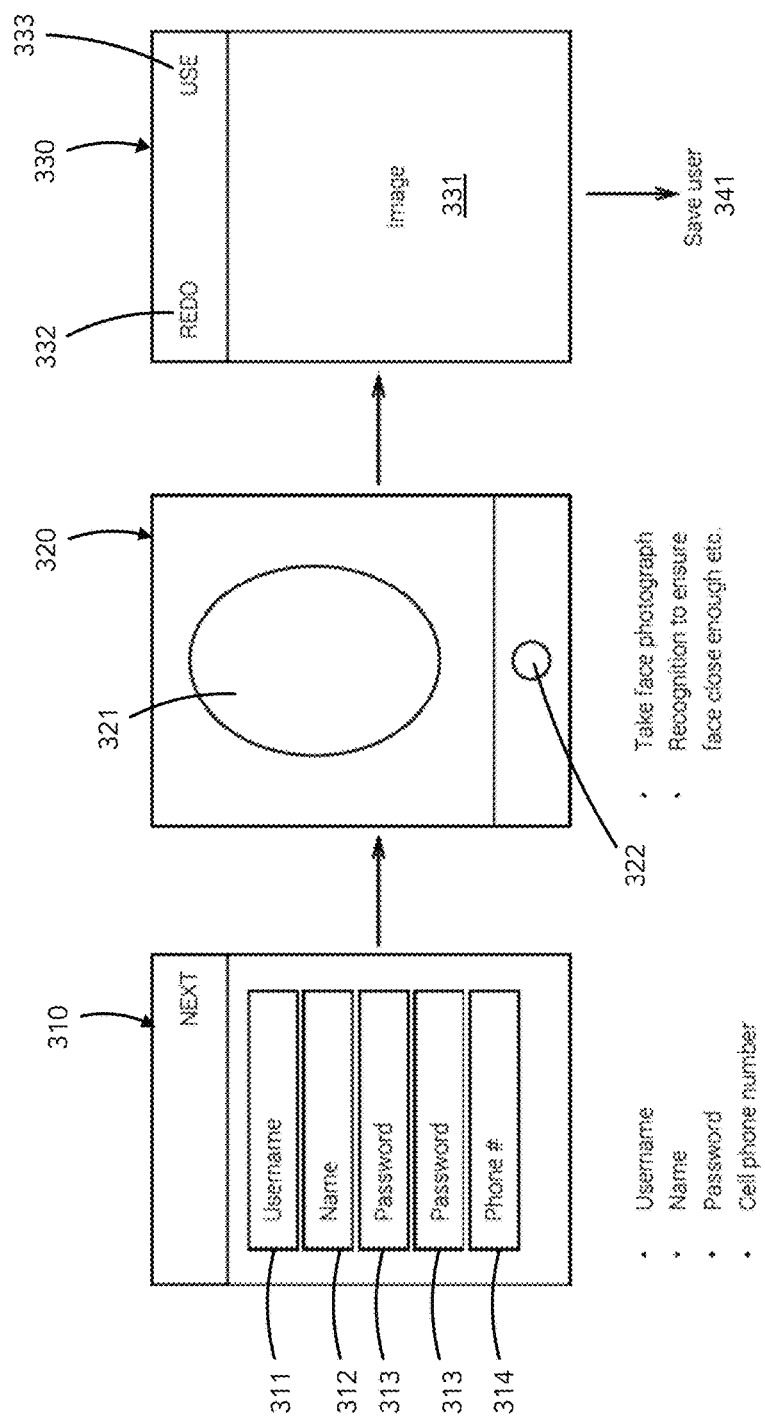
FIG. 3 is a set of exemplary screenshots illustrating the process of signing up for a user account to use the system and method disclosed herein according to some embodiments.
Figure 4:
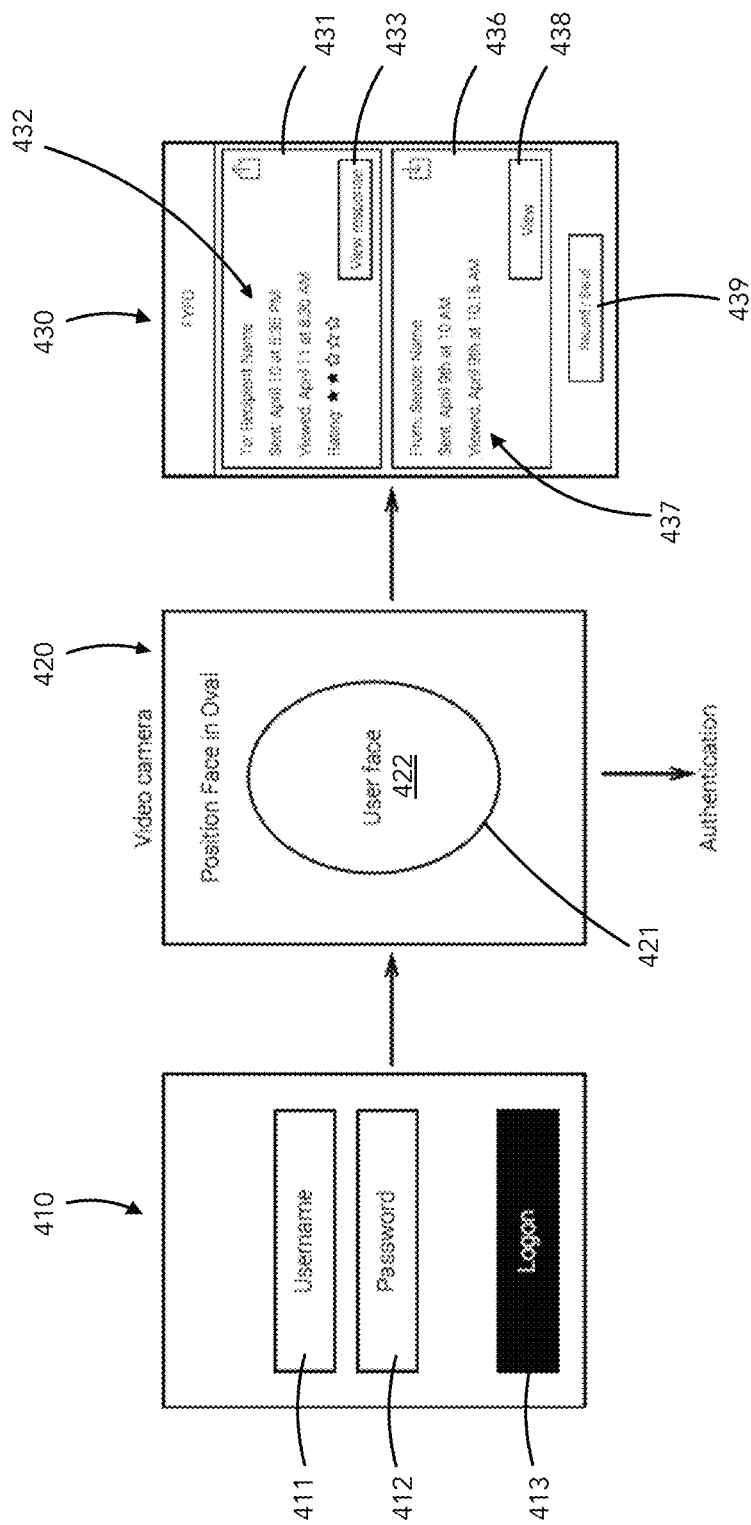
FIG. 4 is a set of exemplary screenshots illustrating the process of logging in to a user account in order to use the system and method disclosed herein according to some embodiments.
Figure 5:
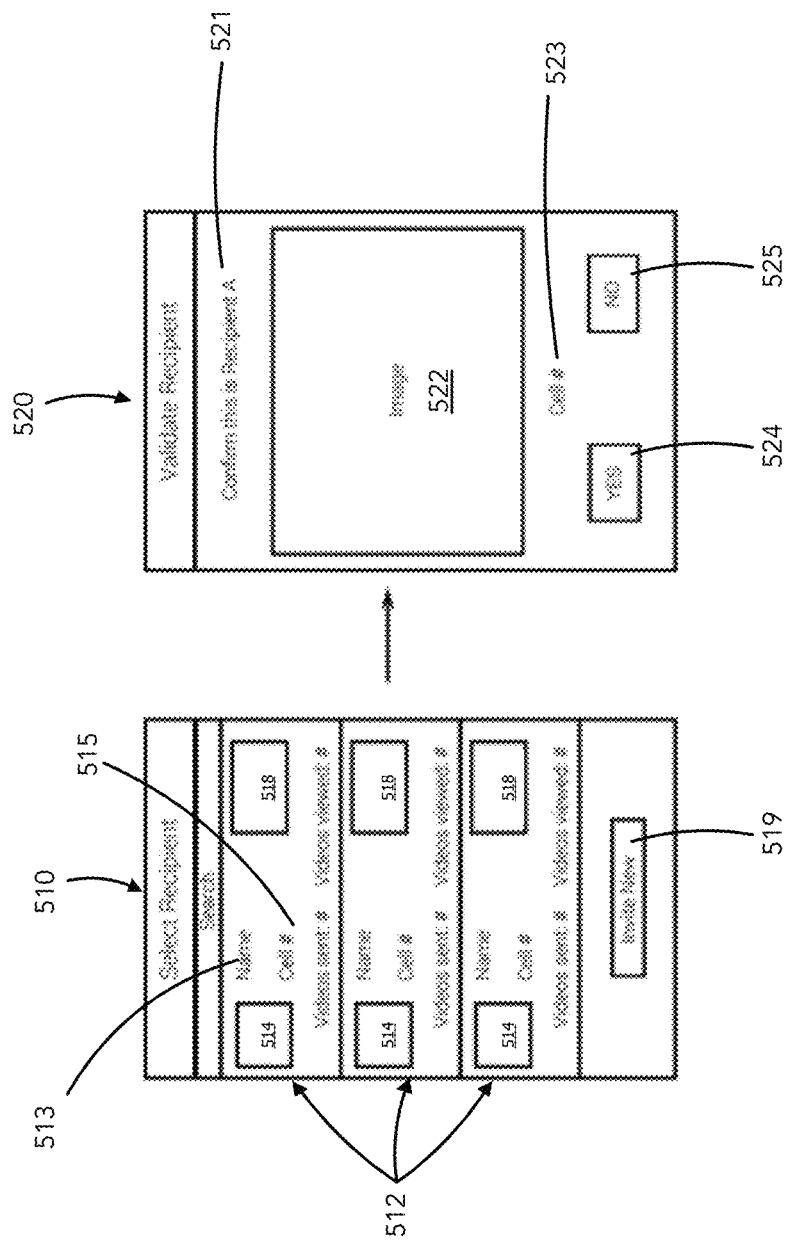
FIG. 5 is a set of exemplary screenshots illustrating the use of the system and method disclosed herein to select and validate a recipient to receive content sent by the user, according to some embodiments.

The operation of the social-sharing application disclosed herein is illustrated by the exemplary screenshots shown in FIGS. 3-5.

FIG. 3 illustrates the process of signing up for an account to use the application. The user first sees screen 310, where user enters his/her data, including a username 311, name 312, password 313 and phone number 314. Next is screen 320, at which the user takes a photograph to be used for identification. User positions the front-facing (selfie) camera such that an image of his/her face is framed within oval 321 and is a large enough to be used for facial recognition, and presses button 322 to capture the image. The captured image 331 is then displayed at screen 330, the user can choose this image by pressing "Use" button 333 or can retake the photograph by pressing "Redo" button 332. In the former case the user is saved as a user in the system at step 341, and in the latter case the user is taken back to screen 320 so that the photograph can be retaken.

FIG. 4 illustrates the process of logging on to the application. At screen 410 the user enters his/her credentials, i.e. username at 411 and password at 412, and presses "Logon" button 413 to proceed. The user is then taken to screen 420, where the front-facing camera is activated and the user is instructed to position the device such that an image 422 of user's face is framed in oval 421, where visual data captured by the front-facing camera are displayed. The application then attempts to verify the user's identity using facial recognition. If the authentication is successful, i.e. the user has successfully logged in, user is then taken to a "home" screen within the application, such as exemplary "home" screen 430. Screen 430 lists content sent and received by the user, such as sent content 431 and received content 436. Listing of sent content 431 includes information 432 about the sent content (recipient name, time sent, time viewed, rating received) and a link 433 for the user to view the recipient's response to the sent content. Similarly, listing of received content 436 includes information 437 about the received content (sender name, time sent, time viewed) and a link 438 for the user to view the received content. Screen 430 shows one example each of sent and received content, but the application's home screen could list multiple items of each type, as screen space allows, and the listing could extend beyond what will fit on a single screen by allowing the user to scroll or page through a longer listing. Screen 430 also includes Record/Send button 439, by which the user can initiate the recording and/or uploading of content to send to another user. By requiring facial authentication at every logon, the application ensures that users are not sharing accounts, and that the expected user is the person logged in to a given user account.

FIG. 5 illustrates the process by which a sender selects a recipient to receive content via the application. Screen 510, which could be reached by tapping button 439, shows a list of potential recipients 512, i.e. other users registered within the application and known to sender, with certain information about them, including names 513 and "thumbnail" facial images 514 and other information 515. Screen 510 lists 3 users, but the screen could list any number of users, and the listing could extend beyond what will fit on a single screen by allowing the user to scroll or page through a longer listing. The "Validate" buttons 518 allow the sender to optionally confirm the identities of other listed users, as shown in facial images 514, whether or not the sender currently intends to interact with such users, and thereby provide useful information to the application regarding the validity of each registered user's identity. "Invite New" button 519 allows the sender to invite a person known to the sender but not yet registered with the application to register with the application, e.g. in order to be able to receive content from the sender. After selecting a recipient, screen 520 is shown, wherein a full-size image of the recipient's face 522 is shown and the sender is asked to confirm the recipient's identity based on the name 521, image 522 and other information, e.g. mobile phone number 523. Sender must confirm recipient's identity using the "Yes" button 524, in order to proceed with sending content to the recipient; if sender uses the "No" button 525, sending of content does not proceed.

The user validation feature provides an addition level of security. The application may track the number of validations each user receives from other users based on photograph and other information, and present such information to other users. If more users have validated a user's identity, potential senders may have more confidence in sending content to that user, i.e. that the content will go to the intended recipient. If a user is reported by another user as being listed with a photo that does not match his/her identity, such a user could be "flagged," or suspended from using the system, until the problem is resolved, in order to avoid users sending content to the wrong person. The application may also use such information in connection with the facial recognition feature, for example to determine how close a match is required between a user's stored photograph and his/her image in a device's camera when using the application.

Figure 6:
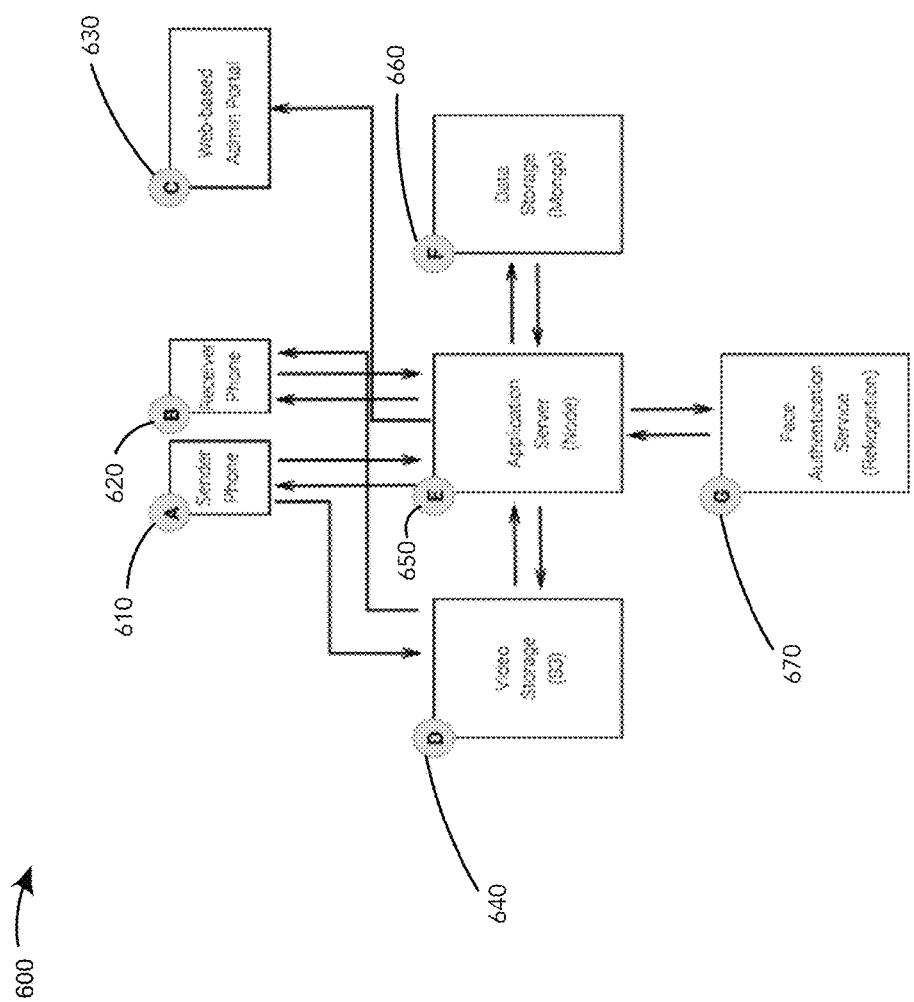
FIG. 6 is a schematic diagram illustrating a representative system architecture underlying the system and method disclosed herein according to some embodiments.

FIG. 6 illustrates in schematic form an exemplary system architecture 600 for the content sharing application disclosed herein. The components of such architecture are described below.

Sender Phone Applications 610 and Receiver Phone Applications 620 are native applications on users' mobile devices (e.g., iOS and Android applications) that present login, authentication, recipient selection, recipient validation, recording, reviewing response and other views. Such applications 610, 620 manage face detection to ensure that the respective viewer's face is centered on the front facing camera, close enough to the camera, and stays within those bounds during viewing. The applications 610, 620 call the face authentication application program interface (API) (through the back-end server 650) to authenticate the respective user's face (e.g., via face recognition server 670).

The web-based admin portal 630 is used by service managers to track usage, manage users, manage videos, and other administrative features.

The video storage server 640 stores users' videos and provides expiring links to the application server 650 based on authenticated user requests to view videos (both original and responses). In some embodiments, the video storage server 640 comprises a third-party service such as Amazon Simple Storage Service (Amazon S3), which is object storage with a simple web service interface to store and retrieve any amount of data from anywhere on the web.

The application server 650 can be or can include a set of APIs, which may be node.js-based, to manage user authentication, sending and receiving videos, outbound notifications, admin features and access to the data storage server 660, as well as the rules around face authentication.

The data storage server 660 stores all user information and video metadata. The data storage server 660 may comprise a Mongo database or similar database. MongoDB is a free and open-source cross-platform document-oriented database program. Classified as a NoSQL database program, MongoDB uses JSON-like documents with schemas.

The face recognition server 670 can comprise a third-party service (e.g., Amazon's Rekognition service) that matches login and user photos provided by the application server 650 and respond with a percentage match.

Figure 7:
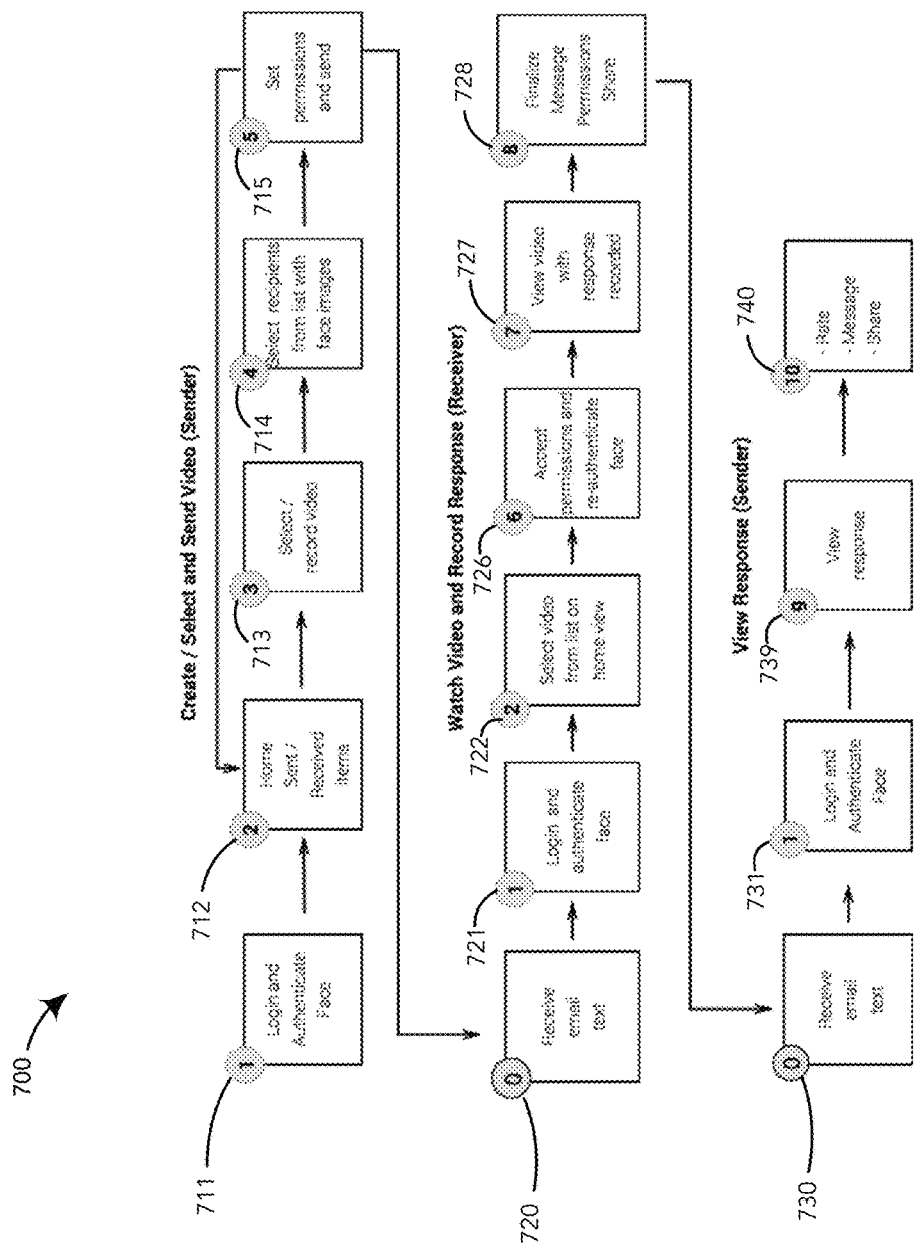
FIGS. 7-8 are representative flowcharts illustrating the operation of the system and method disclosed herein according to some embodiments.
Figure 8:
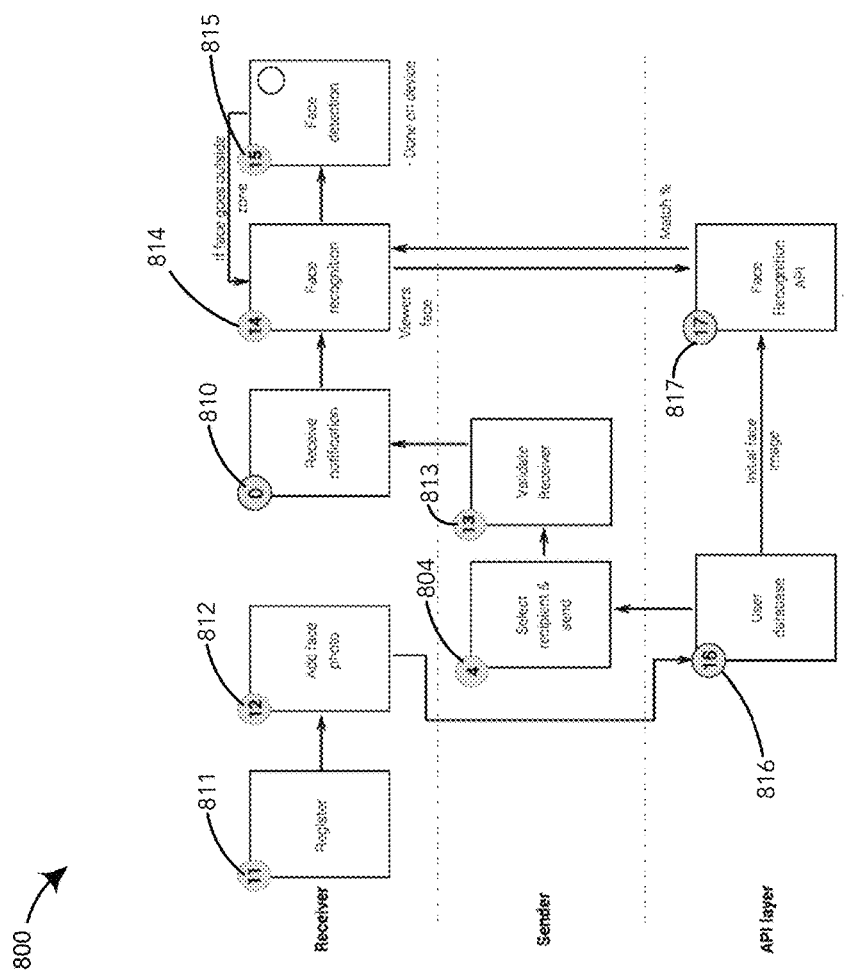

FIGS. 7-8 are exemplary flowcharts illustrating the operation of the content sharing application disclosed herein. Flowchart 700 in FIG. 7 illustrates the operation of the application on the mobile devices used by a sender and receiver of content. In the first row of the chart, the sender logs in and authenticates his/her face at 711 and then goes to the home screen at 712 where sent and/or received items are displayed. A video or image is selected or recorded at 713, then recipients are selected at 714, and the sender sets permissions (e.g., whether the receiver is permitted to share content) and sends at 715. In the second row of the chart, the receiver receives a notification regarding the transmission at 720, logs in and authenticates his/her face at 721 and goes to a home screen at 722, where a list of received videos/images appears. At 726 recipient accepts permissions/conditions imposed by sender to view the content, and re-authenticates his/her face. Re-authentication is required before viewing content to ensure that the content is actually being viewed by the user associated with the account. At 727 recipient views the content, while the device's front-facing camera is recording recipient's reaction, and then at 728 the reaction video is sent to sender, and recipient can set permissions—e.g. whether sender may share reaction video, rate and/or share the content, send a message to sender, etc. In the third row of the chart, the sender receives a notification regarding recipient's viewing of the content at 730, logs in and authenticates at 731, views the response video, ratings, messages, etc. at 739, and at 740 can rate and/or share the response, send a message to recipient, etc.

Flowchart 800 in FIG. 8 illustrates the process by which the application disclosed herein performs facial authentication. At 811 and 812 a potential recipient of content registers with the application and adds a facial photo. Recipient's information and photo are uploaded and stored in a database, via user database API 816, after which a potential sender is able to select recipient at 804 to receive content. Sender validates recipient at 813 after viewing recipient's photo, and the content is sent to recipient, who receives notification at 810. Before showing the sent content to recipient, the application performs facial recognition at 814 by capturing recipient's face in the device's front-facing camera and interacting with facial recognition, via face recognition API 817, which in turn retrieves recipient's stored facial image from database 816 and performs a comparison with the image sent by recipient's device and returns a percentage likelihood of a match. If the facial images match sufficiently, then the sent content is shown to recipient, during which time recipient's face must remain close to and in view of his/her device's front-facing camera. In some embodiments, the facial recognition could be performed on the mobile device itself, i.e. without the involvement of a third party facial recognition service, in whole or in part. While content is being displayed, device continually performs facial detection at 815 to ensure that the intended recipient is viewing the content. If device detects that recipient's face is no longer in the zone where it can be viewed by the front-facing camera, the content stops displaying until recipient's face is returned to said zone and re-authenticated at 814.

Figure 9:
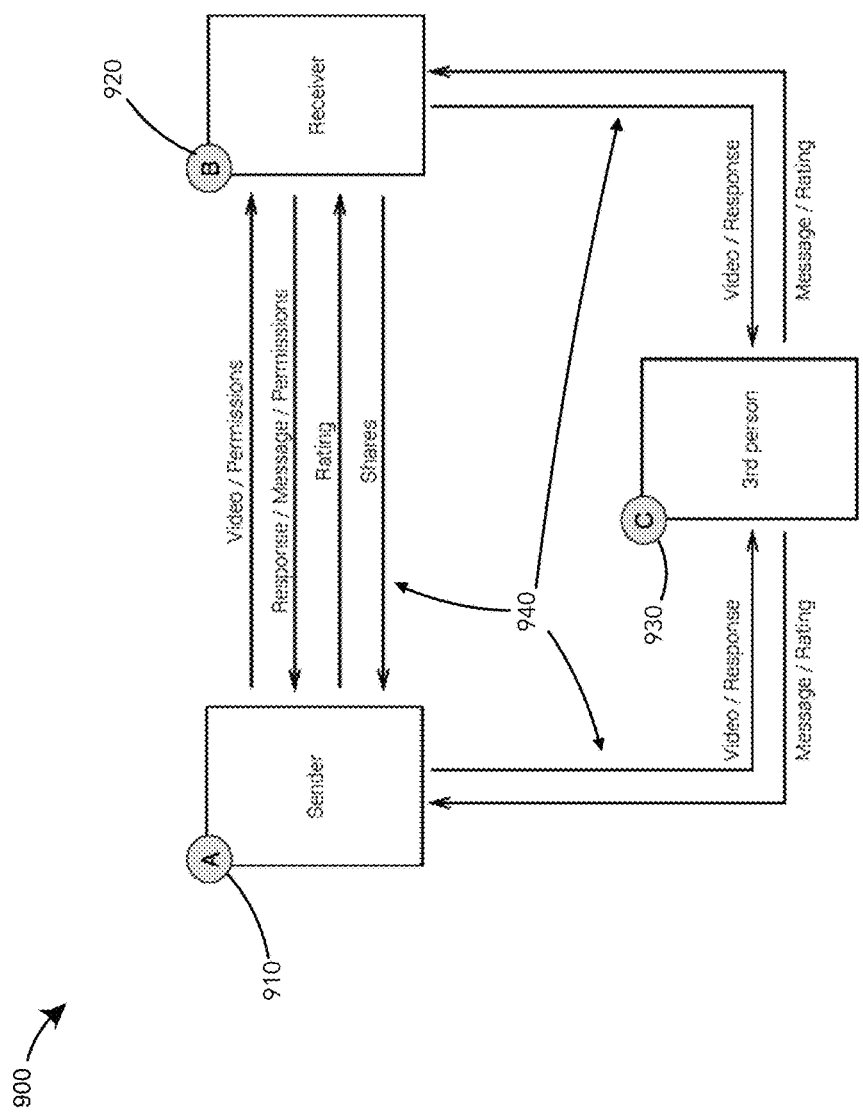
FIG. 9 is a schematic diagram illustrating flows of information and content between users of the system and method disclosed herein according to some embodiments.

FIG. 9 depicts an exemplary schematic diagram 900 that illustrates flows of information and content between users of the application disclosed herein. The chart depicts a sender 910 a recipient 920 and a $3^{rd}$ person 930. Each user is able to transmit videos, images, response/reaction videos, permissions/conditions, messages, ratings and shares, as illustrated in the chart by flow arrows 940.

FIGS. 10A, 10B, 11A, 11B, 11C, 12A and 12B depict exemplary screenshots on a mobile device for the application disclosed herein according to some embodiments, as they would be seen, respectively, by a sender sending a video, a recipient viewing the video, and the sender viewing the recipient's reaction to the video.

Figure 10A:
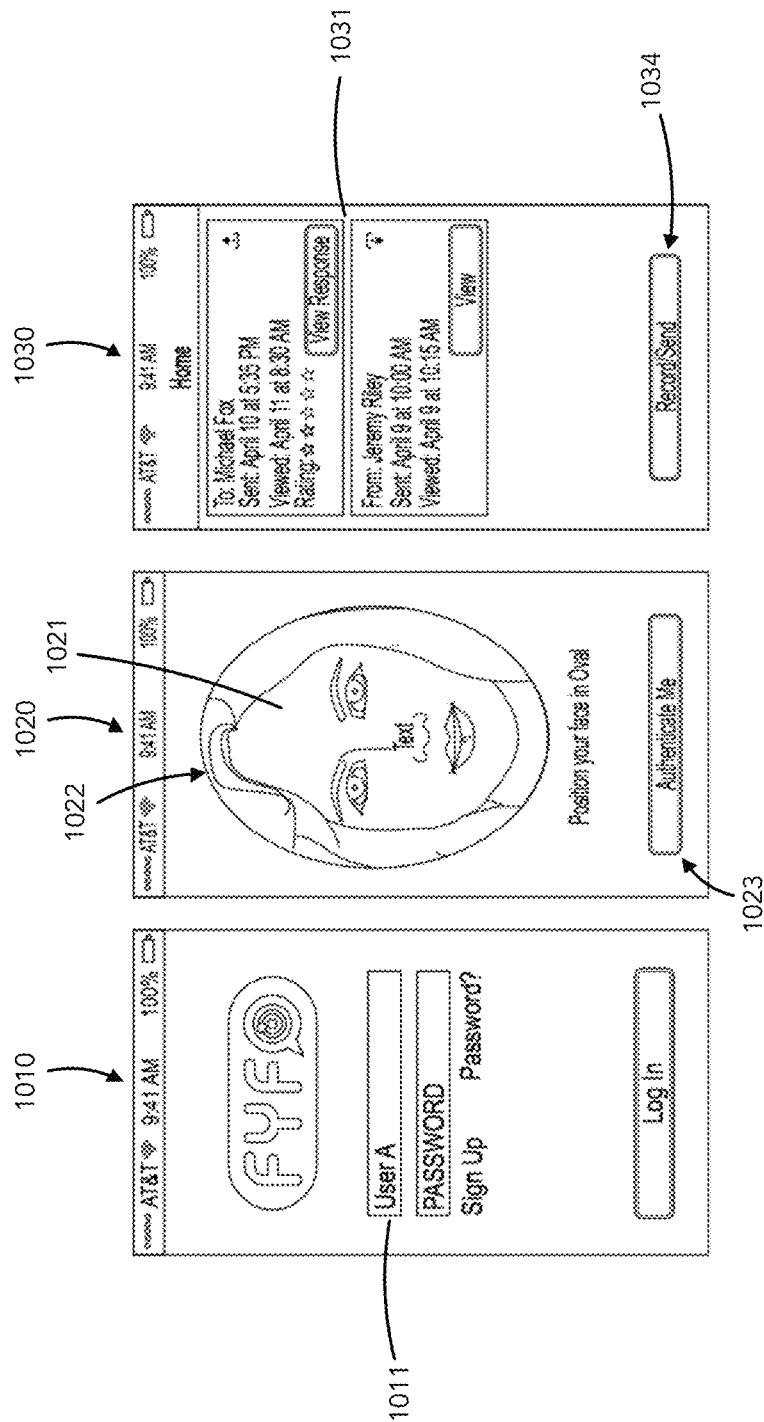
FIGS. 10A and 10B show exemplary screenshots that would be seen by one who is using the system and method disclosed herein to send video content, according to some embodiments.

In FIG. 10A the sender logs in by entering her username and password 1011 at screen 1010, and then authenticating her identity with facial recognition at screen 1020 by positioning her face in front of the device's screen where it can be captured by the device's front-facing camera (not shown), until an image of her face 1021 appears within oval 1022, and presses button 1023, whereupon the application attempts to authenticate the user based of facial recognition. If the authentication is successful, the application proceeds to home screen 1030, which displays a list 1031 of sent and received content and a button 1034 where she can select "Record/Send" to send a video or other content.

Figure 10B:
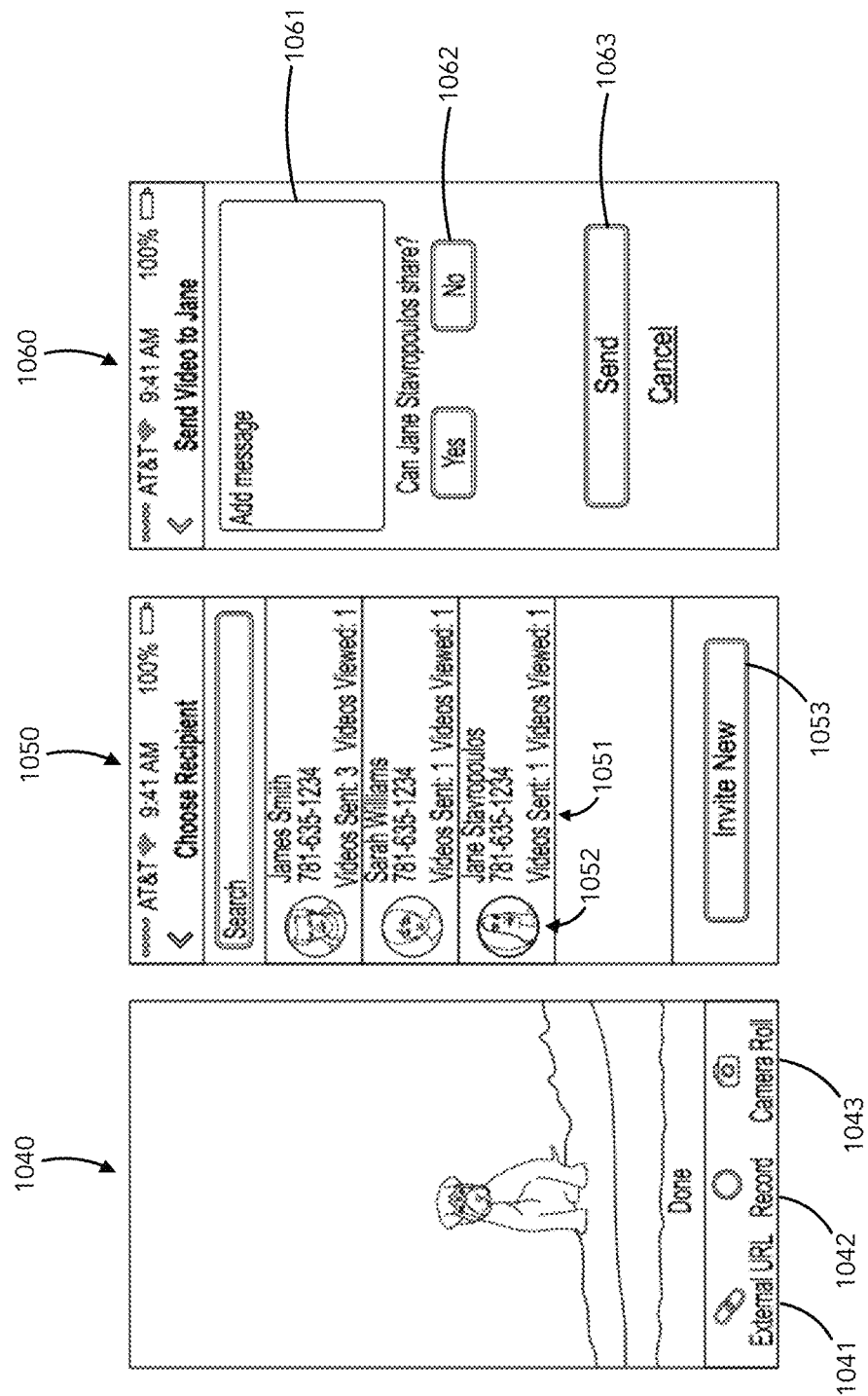

In FIG. 10B, at screen 1040 the sender is recording a video using the mobile device's rear-facing camera; alternatively, the sender could have used the device's front-facing camera, or a combination of both cameras, or selected a video recorded earlier that is stored on her device or otherwise available to her. The sender has pressed "Record" button 1042 to record a video for sending. Alternately or in addition, the sender could have pressed button 1041 to embed an external URL address of an internet location where content, such as a video recording, can be found, or pressed button 1043 to access the photographs and/or video recordings previously captured by the device and stored thereon. At screen 1050 the sender can select, from a "friends" list 1051, one or more users as a recipient to receive the video, or alternatively invite a person not listed by using "Invite New" button 1053. Screen 1060 assumes that the sender has selected user 1052 as recipient. Sender then completes the sending process at screen 1060, which assumes recipient 1052 has been selected as recipient at screen 1050. At screen 1060 the sender can optionally add a message to recipient in box 1061, and can specify whether recipient has permission to further share the video using buttons 1062, before pressing "Send" button 1063 to send the video.

Figure 11A:
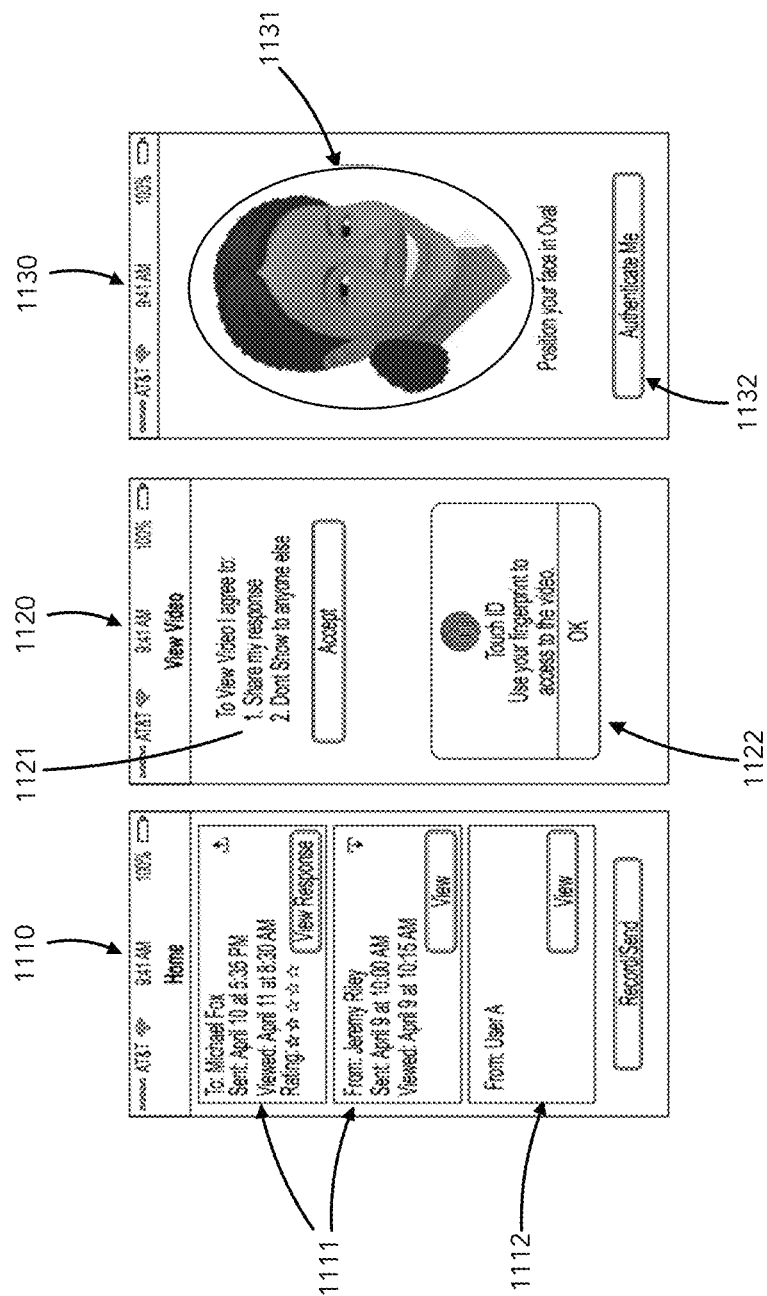
FIGS. 11A, 11B and 11C show exemplary screenshots that would be seen by one who is using the system and method disclosed herein to receive video content and to record a reaction to such content, according to some embodiments.

In FIG. 11A the recipient, after having logged in to the application, views her home screen 1110, where she can see a list 1111 of sent and received videos, similar to the list 1031 seen by the sender in screen 1030 of FIG. 10A, and select a received video 1112 for viewing. At screen 1120 the recipient is asked to accept the conditions 1121 imposed by the sender for viewing the video, which she must do in order to view the video. Recipient is also asked to re-authenticate her identity in box 1122 using fingerprint identification, a feature that may be present in some embodiments. Then, at screen 1130 recipient is asked to authenticate her identity using facial recognition, by positioning the image of her face, captured with the device's front-facing camera, in oval 1131 and pressing button 1132, much as sender did at screen 1020 of FIG. 10A.

Figure 11B:
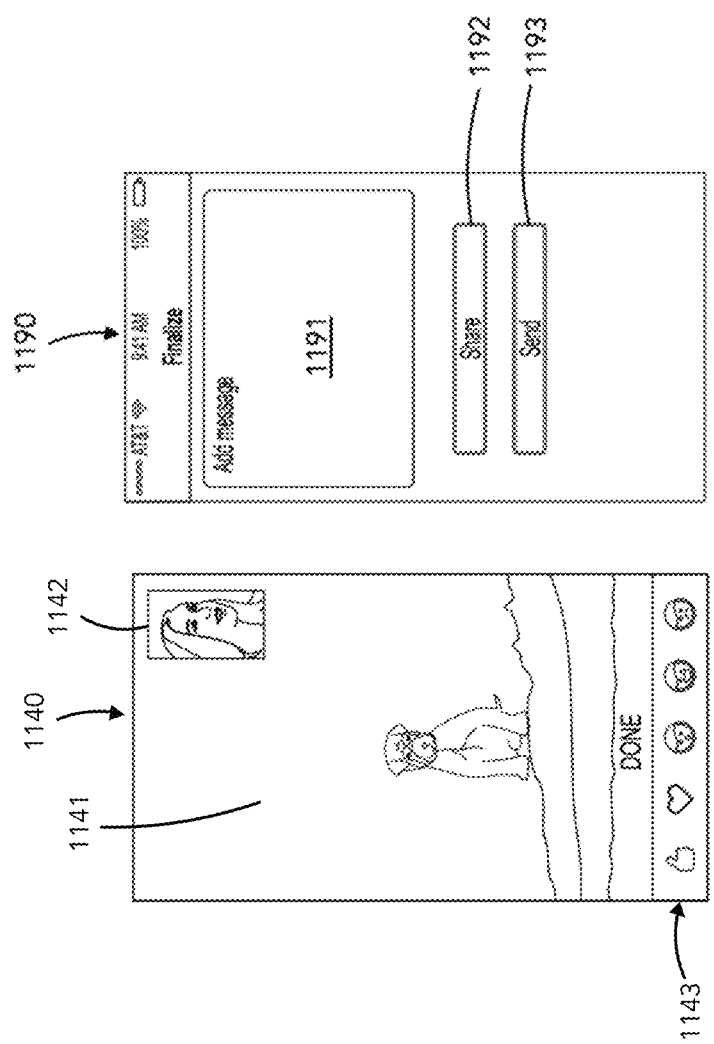

In FIG. 11B, the video plays at screen 1040 once the authentication at screen 1030 is successful. The video 1141 is shown on most of the screen, while recipient's reaction is captured with her device's front-facing camera and displayed in the picture-in-picture window 1142 in the upper-right corner. Video of the recipient's reaction is streamed to the server as it is recorded, guaranteeing that it will be available for viewing by the sender. At the bottom of the screen is a menu 1043 of emoji that recipient can optionally select to enhance the reaction video. At screen 1190 the video has finished playing, and the recipient is able to enter an optional message for the sender in box 1191 before sending her reaction video to the sender with button 1193; the recipient is also able to share the video with others using button 1192 if the sender has granted permission to do so.

Figure 11C:
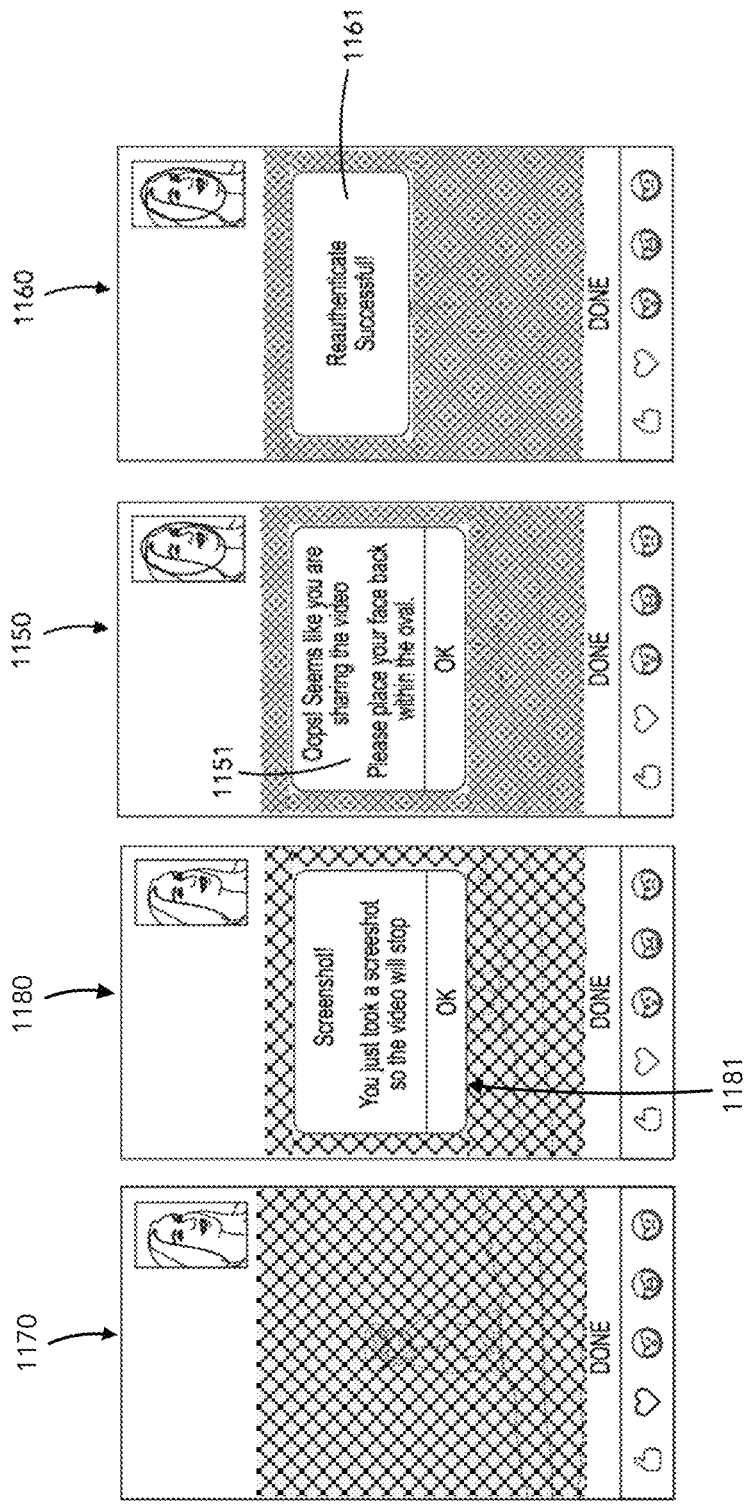

In FIG. 11C, at screen 1170 the application has detected that recipient's face has moved from in front of the front-facing camera, meaning that she may be showing the video to someone in addition to herself, and the application has put the video into "stop/blur status," whereby the video is paused and blurred out to prevent unauthorized viewers from viewing the content. The application would also enter "stop/blur status" if it detected a second face in the view of the front-facing camera, or if it detected the absence of a face in the view of such camera, or if the camera's lens were blocked, or there were any other circumstances that might indicate that the video was being viewed by anyone other than the intended recipient. To resume viewing the video the recipient is required to re-authenticate with facial recognition, as instructed in message 1151 on screen 1150, and the recipient would be taken back to screen 1130 to re-authenticate her identity. At screen 1160, recipient is notified with message 1161 that re-authentication was successful, and the video resumes playing at screen 1140 as before. At screen 1180 the recipient has attempted to take a screenshot while the video is playing (which would allow sharing of the content with unauthorized recipients). The application has detected the screenshot and stopped the playing of the video. In such case the video may be placed in "stop/blur" mode, requiring re-authentication to resume, or terminated altogether, as indicated in message 1181. In some embodiments, the application disables the device's screenshot capability while videos or other sent content is being displayed. In some embodiments, the application tracks and counts instances when a recipient takes or attempts to take a screenshot while viewing content and may embody the resulting data in user ratings that are displayed to other users. Users of the application can rate each other to build user reputation ratings; users may use such ratings to help assess how much of a "secure recipient" another user is. A high rating may give other users confidence in engaging with a particular user. Conversely, a low user reputation rating may act as a warning signal that a particular user may not be trustworthy enough to share sensitive or private content with; users may wish to avoid sending content to those they deem to be "serial screen grabbers," for example.

In FIGS. 12A and 12B, the sender of FIGS. 10A and 10B is able to view the recipient's reaction to the video that she sent. In FIG. 12A, sender logs in and authenticates her identity with facial recognition at screens 1210 and 1220, as previously, and then proceeds to home screen 1230 where the list 1231 of sent and received videos appears and now includes a listing of the video 1232 sent to the recipient in FIGS. 10A and 10B and viewed by her in FIGS. 11A, 11B and 11C. The sender can select "View Response" button 1233 to view the recipient's response to video 1232.

Doing so brings the sender to screen 1240 of FIG. 12B, where the recipient's reaction video 1241 is displayed on the most of the screen, while the sent video to which she was reacting displays simultaneously in the picture-in-picture window 1242 in the upper-right. The videos are synchronized so that the sender can see what the recipient was reacting to at any given moment. Screen 1260 is an alternative format for viewing the reaction video in "landscape" mode, which may be useful if the reaction video was recorded in that mode. The reaction video 1261 and the sent video 1262 are displayed as in screen 1240. At the bottom of screen 1260 is a progress bar 1264 and a display of emoji 1263 were selected by recipient to enhance her reaction video. Finally, at screen 1250 the reaction video has finished playing, and the sender is given the option to rate the reaction video with a star rating at 1251 and/or send a message to the video's recipient in box 1252, and send such reactions and/or ratings using button 1254. Also, sender can share the reaction video with others using button 1253, assuming recipient has granted permission to do so. In some embodiments, the sender may be able to view the recipient's reaction video in real time, as it is being streamed while recipient views the video sent by the sender, if the sender is connected to the application at the time.

The disclosure herein regarding the sharing application is in the context of a single sender and a single recipient, but also contemplates allowing a sender to securely send content to multiple recipients simultaneously and view each recipient's reaction. The disclosure also contemplates embodiments whereby two or more parties could interact in real time, such as for an online business meeting, video call or video conference call, while the application ensures, using biometric authentication as described herein, that only the authorized parties are present on the call. Some such embodiments could comprise part of a secure business meeting platform, and could interface with existing business meeting platforms (e.g. WebEx, GoToMeeting) to provide security features to such platforms.

In an embodiment, the shared context may comprise a video stream, a plurality of pictorial digital images, or any digital or electronic file. Specifically, the content can be a PDF or Microsoft Office or other type of file displayed for a particular intended recipient on the recipient's screen. The application would employ the same methods described herein to confirm the identity of the recipient and authenticate the recipient using a recipient biometric such as facial recognition of the recipient's face as taken in real-time using a camera observing the recipient. In this example, a recipient may be allowed to view a document on the recipient's device, only so long as the recipient's face is recognized in a front-facing camera image of the recipient compared against a database to authenticate the same. If the recipient's face does not appear in the image, or if another person other than the desired recipient appears in the camera image the system can interrupt the transmission and cease to present the document to the device. Optionally, the system can alert the sender of this condition and/or request that the recipient re-authenticate himself or herself.

In addition, some embodiments may provide an infrastructure and method for signing an electronic document, or substituting for a conventional signature or electronic signature. The present system and method may therefore employ the presently-disclosed techniques so that a recipient of a document can securely "sign" an electronic document by using the biometric interfaces presented herein. Not only could a recipient view an electronic document as discussed, but may additionally embed a biometrically-authenticated signature or mark, data or other information into the document, which is then re-transmitted back to the sender or another party as a signed version of the document. The system and method would ensure that the proper recipient is the person who "signed" the document and this signature can be used for trusted transactions.

FIG. 13 illustrates in schematic form an exemplary system architecture 1300 for the use of content sharing application disclosed herein for business meetings or video conferences. The components of such architecture are described below.

Participant Applications 1310 and 1320 are native applications on users' mobile devices (e.g., iOS and Android applications) (or native or web-based applications on desktop and laptop computers) that present login, authentication, counterparty selection, counterparty validation, optional recording, and other views. Such applications 1310, 1320 manage face detection to ensure that the respective viewer's face is centered on the front facing camera, close enough to the camera, and stays within those bounds during the meeting. The applications 1310, 1320 call the face authentication API (through the back-end server 1350) to authenticate the respective user's face (e.g., via face recognition server 1360). Two participants are shown here for the purposes of illustration, but the technology is not limited to two participants; the architecture as shown would be applicable to conferences with three or more participants, in like manner as illustrated here.

The web-based admin portal 1330 is used by service managers to track usage, manage users, manage groups, and other administrative features.

The streaming video server 1340 is in communication with each participant's device in order to continuously send video and audio content to and receive such content from each participant's device. The server 1340 is in communication with the application server 1350 in order to verify each participant's authentication and permission status and to restrict participation to authorized participants. In some embodiments, the streaming video server 1340 comprises a third-party service.

The application server 1350, which is in communication with each participant's device, can be or can include a set of APIs, which may be node.js-based, to manage participant permissions and authentication, sending and receiving streaming video content, outbound notifications, admin features and access to the data storage server, as well as the rules around face authentication, and to optionally interface/integrate with third-party online meeting platforms. For example, the application server 1350 can stop or pause the streaming of video and audio signals between the participants if a participant's face, captured by a camera coupled to the participant's device, is not recognized by the face recognition server 1360 (e.g., as described herein).

The face recognition server 1360 is in communication with the application server 1350, and can comprise a third-party service (e.g., Amazon's Rekognition service) that matches login and user photos provided by the application server 1350 and respond with a percentage match.

The data storage server 1370 stores all user information and conference metadata. The data storage server 1370 may comprise a Mongo database or similar database.

It is to be appreciated that certain features of the technology, which are, for clarity, described in the context of separate embodiments, may also be provided in combination in a single embodiment. Conversely, various features of the technology which are, for brevity, described in the context of a single embodiment, may also be provided separately or in any suitable sub-combination. Variations and modifications of the embodiments described herein, which would occur to persons skilled in the art upon reading the foregoing description, are contemplated by and included in this disclosure.

Unless otherwise defined, all technical and scientific terms used herein have the same meanings as are commonly understood by one of ordinary skill in the art to which this technology belongs. Although methods similar or equivalent to those described herein can be used in the practice or testing of the present technology, suitable methods are described herein. The present materials, methods, and examples are illustrative only and not intended to be limiting.

What is claimed is:

1. A method for securely delivering content over a communications network from one person (sender) to a second person (recipient), the method comprising:
   the sender uploading content to a server that is in communication with the communications network;
   using a first computing device equipped with a front-facing camera (sender device) that is in communication with the communications network:
   the sender authenticating his/her identity to the server using one or more biometric identification methods, said biometric identification methods comprising facial recognition methods;
   the sender selecting a recipient to receive the content;
   the sender selecting first and second conditions under which the recipient will be allowed to view the content; and
   notifying the sender when the recipient has viewed the content; and
   using a second computing device equipped with a front-facing camera (recipient device) that is in communication with the communications network:
   notifying the recipient of the availability of the content for viewing;
   the recipient authenticating his/her identity to the server using one or more biometric identification methods, said biometric identification methods comprising facial recognition methods;
   the recipient selecting the content for viewing;
   notifying the recipient of the conditions for viewing the content that were selected by the sender;
   the recipient communicating his/her agreement to said first condition, his/her rejection of said second condition, and his/her proposal for a third condition for viewing the content;
   using the sender device, the sender communicating his/her agreement to the third condition; and
   using the recipient device:
   the recipient placing his/her face within a viewing range of the front-facing camera of the recipient device;
   while the recipient's face is within said viewing range, the recipient re-authenticating his/her identity to the server using one or more biometric identification methods, said biometric identification methods comprising facial recognition methods;

displaying the content on the recipient device;

while the content is being displayed on the recipient device:

capturing a reaction video that includes video images of recipient's facial reaction with the recipient device's front-facing camera, detecting whether the recipient's face remains within said viewing range, the recipient's face having been authenticated using said facial recognition methods, detecting whether a face other than the recipient's face is within said viewing range, and when the recipient's face is detected not to be within said viewing range or a face other than the recipient's face is detected within said viewing range:

ceasing to display the content on the recipient device, and notifying the recipient that the recipient must re-authenticate his/her identity to the server in order to resume viewing the content;

uploading said reaction video of the recipient's facial reaction to the server; and after the content has been displayed on the recipient device:

the sender placing his/her face within a viewing range of the front-facing camera of the recipient device, while the sender's face is within said viewing range, the sender re-authenticating his/her identity to the server using one or more biometric identification methods, said biometric identification methods comprising facial recognition methods, simultaneously displaying, on the sender device, both the sent content and the reaction video, such that said reaction video is time synchronized with the content so that the sender can see what in the content the recipient is reacting to at any given time with respect to said content, while the content and the reaction video are simultaneously displayed on the sender device:

capturing video images of sender's face with the sender device's front-facing camera, detecting whether the sender's face remains within said viewing range of the front-facing camera of the recipient device, the sender's face having been authenticated using said facial recognition methods, detecting whether a face other than the sender's face is in within said viewing range of the front-facing camera of the recipient device, and when the sender's face is detected not to be within said viewing range of the front-facing camera of the recipient device or a face other than the sender's face is detected within said viewing range of the front-facing camera of the recipient device:

ceasing to display the reaction video on the sender device, and notifying the sender that the sender must re-authenticate his/her identity to the server in order to resume viewing the reaction video; and uploading said video images of sender's face to the server.

2. The method of claim 1, wherein the sender device is a wireless mobile device.

3. The method of claim 1, wherein the recipient device is a wireless mobile device.

4. The method of claim 1, wherein the sender device is a laptop or desktop computer.

5. The method of claim 1, wherein the recipient device is a laptop or desktop computer.

6. The method of claim 1, wherein detecting whether the recipient's face remains within said viewing range or whether a face other than the recipient's face is in within said viewing range is performed using a facial detection feature of an operating system of the recipient device.

7. The method of claim 1, wherein the content comprises a video recording.

8. The method of claim 1, wherein the content comprises one or more photographic images.

9. The method of claim 1, wherein the content comprises an electronic document shared by the sender with the recipient.

10. The method of claim 1, wherein the biometric identification methods used by the sender or the recipient to authenticate his/her identity to the server comprise fingerprint identification methods.

11. The method of claim 1, wherein the biometric identification methods used by the sender or the recipient to authenticate his/her identity to the server comprise a plurality of biometric identification methods.

12. The method of claim 1, wherein the conditions selected by the sender under which the recipient will be allowed to view the content comprise allowing the sender to view the reaction video.

13. The method of claim 12, wherein said conditions comprise allowing the sender to share the reaction video with third parties.

14. The method of claim 12, wherein said conditions comprise the recipient device being disabled from capturing images or screenshots of the content while the content is being displayed on the recipient device.

15. The method of claim 1, wherein the communications network comprises the Internet.

16. The method of claim 1, wherein the content is created by the sender using the sender device.

17. The method of claim 1, further comprising the sender using the sender device and the receiver using the recipient device to send textual and/or other messages to each other and displaying such messages to the other concurrently with the display of the content (in the case of messages sent to recipient) or the reaction video (in the case of messages sent to the sender).

18. A system for securely sharing content over a communications network comprising a server that is in communication with the communications network, and a plurality of computing devices (each a participant device), each such computing device equipped with a front-facing camera, each such computing device in communication with the communications network, each such computing device associated with an individual participant, wherein the server and the participant devices are configured to allow a sharing of content by participants with one another, such sharing of content comprising:

a participant (sender) uploading content to the server;

using the participant device associated with the sender (sender device):

the sender authenticating his/her identity to the server using one or more biometric identification methods, said biometric identification methods comprising facial recognition methods;

the sender selecting one or more other participants (recipients) to receive the content;

the sender selecting one or more conditions under which the recipient or recipients will be allowed to view the content; and notifying the sender when each recipient has viewed the content; and for each recipient, using the participant device or devices associated with such recipient (recipient device):

notifying the recipient of the availability of the content for viewing;

the recipient authenticating his/her identity to the server using one or more biometric identification methods, said biometric identification methods comprising facial recognition methods;

the recipient selecting the content for viewing;

notifying the recipient of the conditions for viewing the content that were selected by the sender;

the recipient communicating his/her agreement to said conditions;

the recipient placing his/her face within a viewing range of the front-facing camera of the recipient device;

while the recipient's face is within said viewing range, the recipient re-authenticating his/her identity to the server using one or more biometric identification methods, said biometric identification methods comprising facial recognition methods;

displaying the content on the recipient device;

while the content is being displayed on the recipient device:

capturing a reaction video that includes video images of recipient's facial reaction with the recipient device's front-facing camera;

detecting whether recipient's face remains within said viewing range, the recipient's face having been authenticated using said facial recognition methods;

detecting whether a face other than the recipient's face is in within said viewing range; and when the recipient's face is detected not to be within said viewing range or a face other than the recipient's face is detected within said viewing range, ceasing to display the content on the recipient device, and notifying the recipient that the recipient must re-authenticate his/her identity to the server in order to resume viewing the content;

uploading said reaction video of the recipient's facial reaction to the server; and after the content has been displayed on the recipient device, simultaneously displaying, on the sender device, both the sent content and the reaction video, such that said reaction video is time synchronized with the content so that the sender can see what in the content the recipient is reacting to at any given time with respect to said content.

19. The system of claim 18, such content comprising video images of a recipient's face captured by the relevant recipient device's front-facing camera during the time that the recipient was viewing content sent by a sender, such sharing of content comprising the recipient sharing such video images with the sender.

20. The system of claim 18, wherein such sharing of content comprises a participant using the relevant participant device to send textual and/or other messages to one or more other participants and displaying such messages to such other participants concurrently with the display of content on the relevant participant device.

21. The system of claim 18, wherein such sharing of content further comprises a participant using the relevant participant device to communicate to the server one or more ratings or other evaluations of content or of another participant, and the server storing such evaluations.

22. The system of claim 21, wherein the server uses such ratings or other evaluations to determine aggregate ratings or other evaluations of participants, and to communicate such aggregate ratings or other evaluations to participants.

23. The system of claim 21, wherein such ratings or other evaluations of participants comprises verification of identities of other participants.

24. The system of claim 23, wherein the server uses such ratings or other evaluations of participants to enhance said biometric identification methods.

25. The system of claim 1, said content comprising an electronic document, the method further comprising embedding a biometrically-authenticated signature into said electronic document as a signature of the recipient on said document.

26. The method of claim 1, wherein
(a) the sender authenticating his/her identity to the server comprises sending an image of the sender's face to the server to perform facial recognition of the sender; or
(b) the recipient authenticating his/her identity to the server comprises sending an image of the recipient's face to the server to perform facial recognition of the recipient; or
(c) both (a) and (b).

27. The method of claim 1, wherein:
(a) the sender authenticating his/her identity to the server comprises:
comparing an image of the sender's face with a prestored image of the sender's face to perform facial recognition of the sender; and
when the image of the sender's face matches the prestored image of the sender's face, sending an indication to the server that the sender's identity is authentic; or
(b) the recipient authenticating his/her identity to the server comprises:
comparing an image of the recipient's face with a prestored image of the recipient's face to perform facial recognition of the recipient; and
when the image of the recipient's face matches the prestored image of the recipient's face, sending an indication to the server that the recipient's identity is authentic; or
(c) both (a) and (b).

28. The system of claim 18, wherein:
(a) the sender authenticating his/her identity to the server comprises:
comparing an image of the sender's face with a prestored image of the sender's face to perform facial recognition of the sender; and
when the image of the sender's face matches the prestored image of the sender's face, sending an indication to the server that the sender's identity is authentic; or
(b) the recipient authenticating his/her identity to the server comprises:
comparing an image of the recipient's face with a prestored image of the recipient's face to perform facial recognition of the recipient; and when the image of the recipient's face matches the prestored image of the recipient's face, sending an indication to the server that the recipient's identity is authentic; or (c) both (a) and (b).

29. The system of claim 18, wherein:
(a) the sender authenticating his/her identity to the server comprises:
  comparing an image of the sender's face with a prestored image of the sender's face to perform facial recognition of the sender; and
  when the image of the sender's face matches the prestored image of the sender's face, sending an indication to the server that the sender's identity is authentic; or
(b) the recipient authenticating his/her identity to the server comprises:
  comparing an image of the recipient's face with a prestored image of the recipient's face to perform facial recognition of the recipient; and
  when the image of the recipient's face matches the prestored image of the recipient's face, sending an indication to the server that the recipient's identity is authentic; or
(c) both (a) and (b).

\* \* \* \* \*